(12) United States Patent
Bae et al.

(10) Patent No.: US 7,162,283 B2
(45) Date of Patent: Jan. 9, 2007

(54) SLIDING TYPE MOBILE TELEPHONE TERMINAL

(75) Inventors: Jong-Gun Bae, Kumi-shi (KR); Jae-Gab Lee, Kumi-shi (KR); Byung-Han Kim, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 420 days.

(21) Appl. No.: 10/302,580

(22) Filed: Nov. 22, 2002

(65) Prior Publication Data
US 2004/0203496 A1 Oct. 14, 2004

(30) Foreign Application Priority Data
Jul. 2, 2002 (KR) ............................... 2002-37910

(51) Int. Cl.
*H04M 1/00* (2006.01)
*H04B 1/38* (2006.01)

(52) U.S. Cl. ................. 455/575.4; 455/575.1; 455/90.3; 455/550.1; 379/433.12

(58) Field of Classification Search ............. 455/575.4, 455/575.1, 575.8, 90.3, 550.1; 379/433.12
See application file for complete search history.

(56) References Cited

U.S. PATENT DOCUMENTS 6,785,565 B1 * 8/2004 Gventer .................... 455/575.4
2003/0094354 A1 * 5/2003 Badarneh ..................... 200/18

* cited by examiner

*Primary Examiner*—Matthew D. Anderson
*Assistant Examiner*—Eugene Yun
(74) *Attorney, Agent, or Firm*—The Farrell Law Firm

(57) ABSTRACT

Disclosed is a sliding type mobile telephone terminal comprising (a) a main housing with upper and lower surfaces, (b) a sliding housing with upper and lower surfaces and first and second guide slots symmetrically formed on the lower surface to have a designated shape, and accepting in a range of a first sliding length a closing force from the main housing and accepting in a range of a second sliding length being disposed above the first sliding length an opening force from the main housing, thereby being closed into and opened from the main housing in a longitudinal direction so that the lower surface of the sliding housing is slid on the upper surface of the main housing, and (c) a module accommodated in the main housing and associated with the first and second guide slots so as to provide the opening and closing forces to the sliding housing.

11 Claims, 8 Drawing Sheets

SLIDING TYPE MOBILE TELEPHONE TERMINAL

PRIORITY

This application claims priority to an application entitled "SLIDING-TYPE PORTABLE PHONE", filed in the Korean Industrial Property Office on Jul. 2, 2002 and assigned U.S. Ser. No. 2002-37910, the contents of which are hereby incorporated by reference.

BACKGROUND OF THE INVENTION

1. Field of the Invention

The present invention relates to a mobile telephone terminal such as a cellular phone, a PDA (Personal Digital Assistant), an HHP (Hand Held Phone), etc., and more particularly to a sliding type mobile telephone terminal in which a sliding housing is opened from and closed into a main housing by a sliding motion.

2. Description of the Related Art

Usually, mobile telephone terminals, also referred to as portable units, communicate with a counterpart mobile terminal via wireless communication with a base station. These conventional mobile telephone terminals are divided into several types according to their external shapes. For example, the mobile telephone terminals may be divided into bar type terminals, flip type terminals, and folder type terminals, according to their shapes. The bar type mobile telephone terminal comprises a bar type single housing. The flip type mobile telephone terminal comprises a bar type main housing, a hinge unit, and a flip rotatably connected to the bar type main housing by the hinge unit, thereby opening and closing from and into the bar type main housing. The folder type mobile telephone terminal comprises a main housing, a hinge unit, and a folder rotatably connected to the main housing by the hinge unit, thereby folding and unfolding the folder into and from the main housing.

Further, the mobile telephone terminals may be divided into necklace type terminals, wristlet type terminals, etc., according to their wearing locations. The necklace type terminal is hung on a user's neck using a string and the wristlet type terminal is strapped to a user's wrist.

Moreover, the mobile telephone terminals may be divided into rotation type terminals and sliding type terminals according to their opening and closing methods. The rotation type terminal is opened and closed by relative rotational motion of its two housings disposed opposite to each other and rotatably connected to the each other. The sliding type terminal is opened and closed by sliding motion of its two housings.

Those skilled in the art will appreciate the above described various mobile telephone terminals.

Hereinafter, among the aforementioned various types of mobile telephone terminals, the sliding type mobile telephone terminal is described in detail. The sliding type mobile telephone terminal comprises two housings. One housing is opened from and closed into the other housing by being slid on the other housing in a longitudinal direction.

However, the conventional sliding type mobile telephone terminal is fully opened or closed only when a user manually applies force to the mobile telephone terminal from the beginning to the end of the opening or closing operation. This causes an inconvenience to the user during opening and closing operations. As a result, in order to solve this problem, a sliding type mobile telephone terminal for being conveniently opened and closed with a minimum force is required.

SUMMARY OF THE INVENTION

Therefore, the present invention has been made in view of the above problems, and it is an object of the present invention to provide a sliding type mobile telephone terminal comprising a module for providing opening and closing forces by sliding motion.

It is another object of the present invention to provide a sliding type mobile telephone terminal which can be conveniently used.

In accordance with the present invention, the above and other objects can be accomplished by the provision of a sliding type mobile telephone terminal comprising (a) a main housing with upper and lower surfaces, (b) a sliding housing with upper and lower surfaces and first and second guide slots symmetrically formed on the lower surface to have a designated shape, and accepting in a range of a first sliding length a closing force from the main housing and accepting in a range of a second sliding length being disposed above the first sliding length an opening force from the main housing, thereby being closed into and opened from the main housing in a longitudinal direction so that the lower surface of the sliding housing is slid on the upper surface of the main housing, and (c) a module accommodated in the main housing and associated with the first and second guide slots so as to provide the opening and closing forces to the sliding housing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
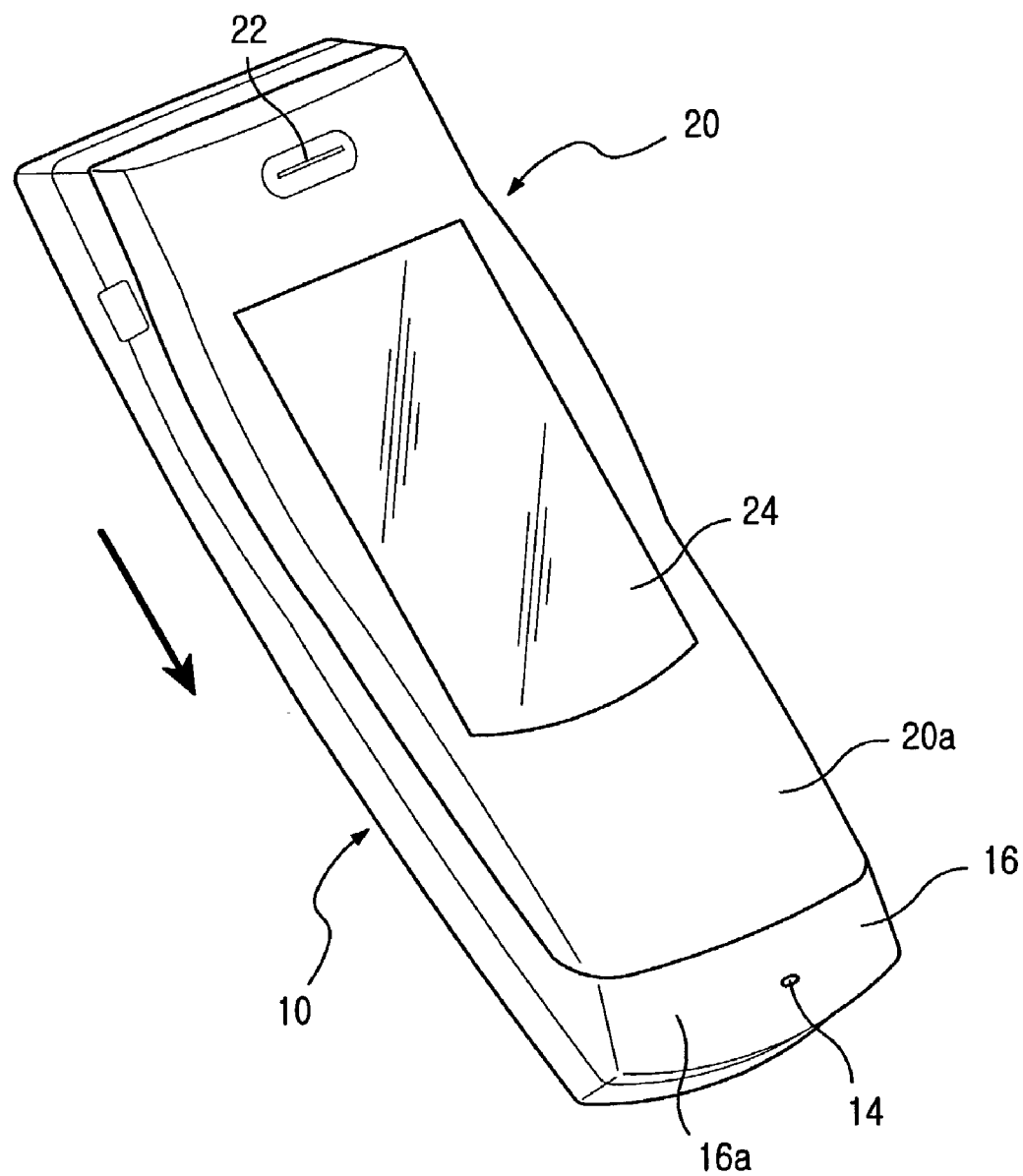
FIG. 1 is a perspective view of a sliding type mobile telephone terminal in a closed condition of a sliding housing into a main housing in accordance with a preferred embodiment of the present invention.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations are omitted to avoid making the subject matter of the present invention unclear.

Figure 2:
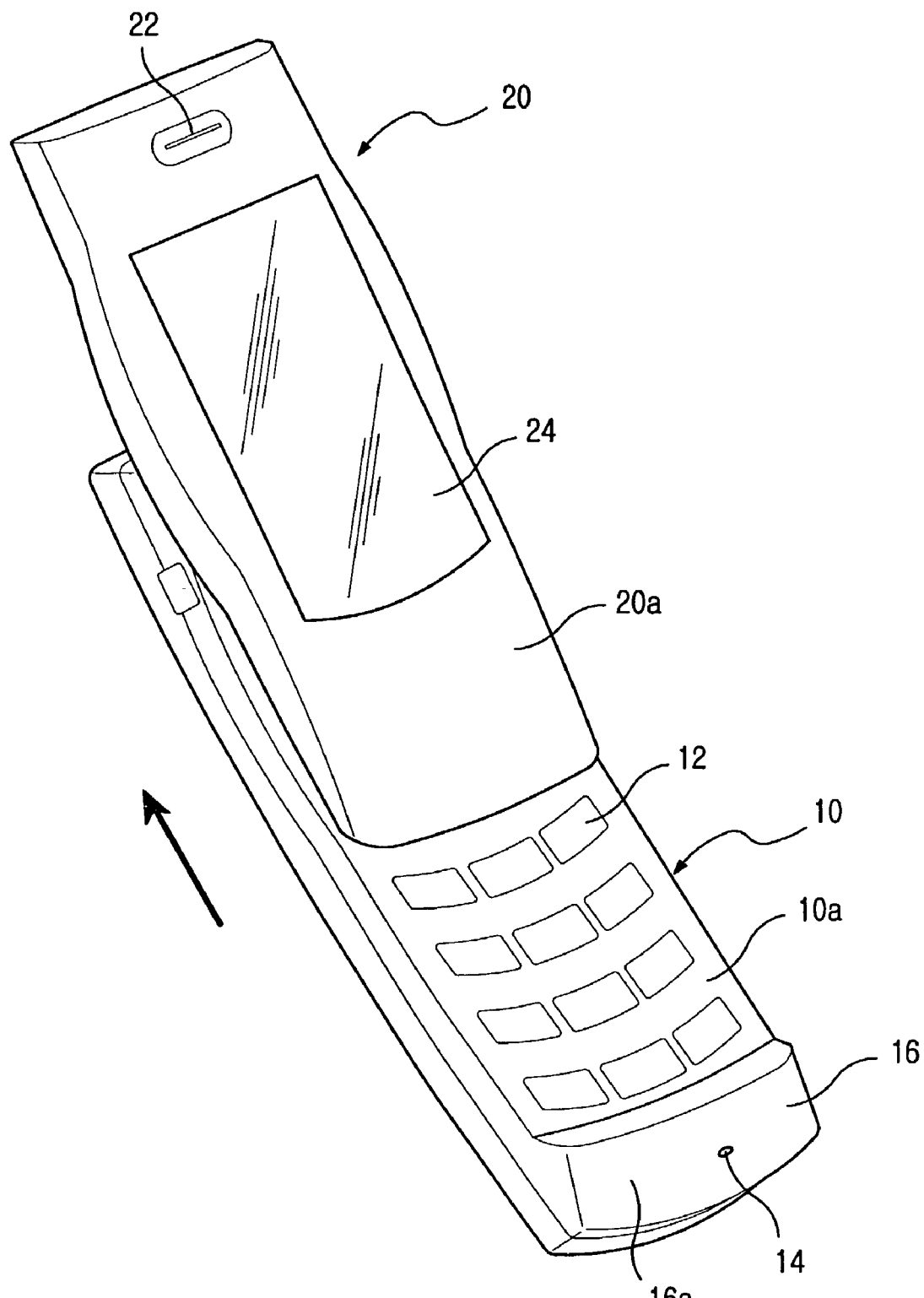
FIG. 2 is a perspective view of the sliding type mobile telephone terminal in an opened condition of the sliding housing slid away from the main housing in accordance with the preferred embodiment of the present invention.

FIGS. 1 and 2 perspectively show a sliding type mobile telephone terminal in accordance with a preferred embodiment of the present invention. FIG. 1 is a perspective view of the sliding type mobile telephone terminal in a closed condition of a sliding housing 20 into a main housing 10. FIG. 2 is a perspective view of the sliding type mobile telephone terminal in an opened condition of the sliding housing 20 slid away from the main housing 10. In the sliding type mobile telephone terminal of the present invention, the sliding housing 20 is opened from and closed into the main housing 10 in a longitudinal direction by sliding motion.

Figure 6A:
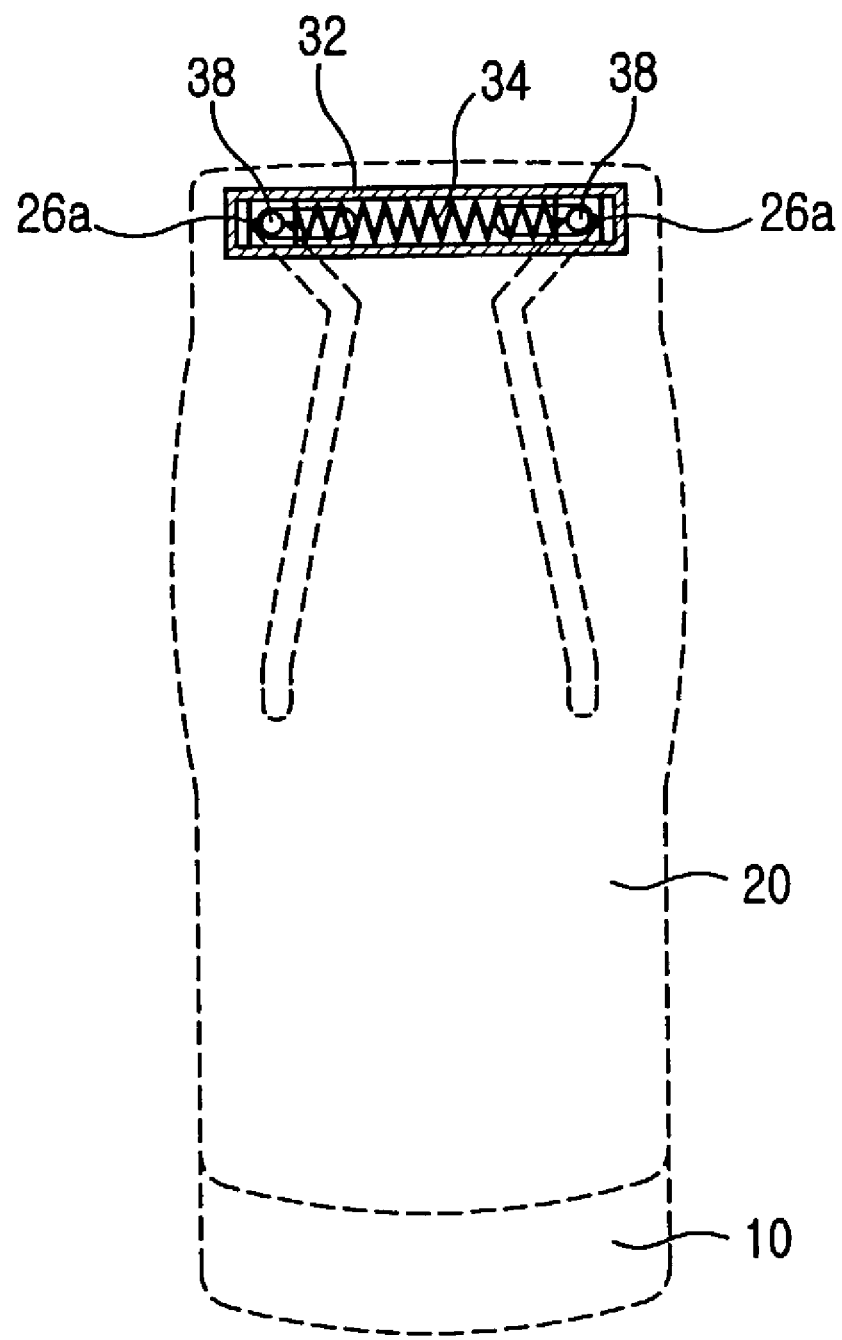
FIGS. 6A to 6C are plan views respectively showing opening and closing processes of the sliding type mobile telephone terminal and operation of the module in accordance with the preferred embodiment of the present invention.
Figure 6B:
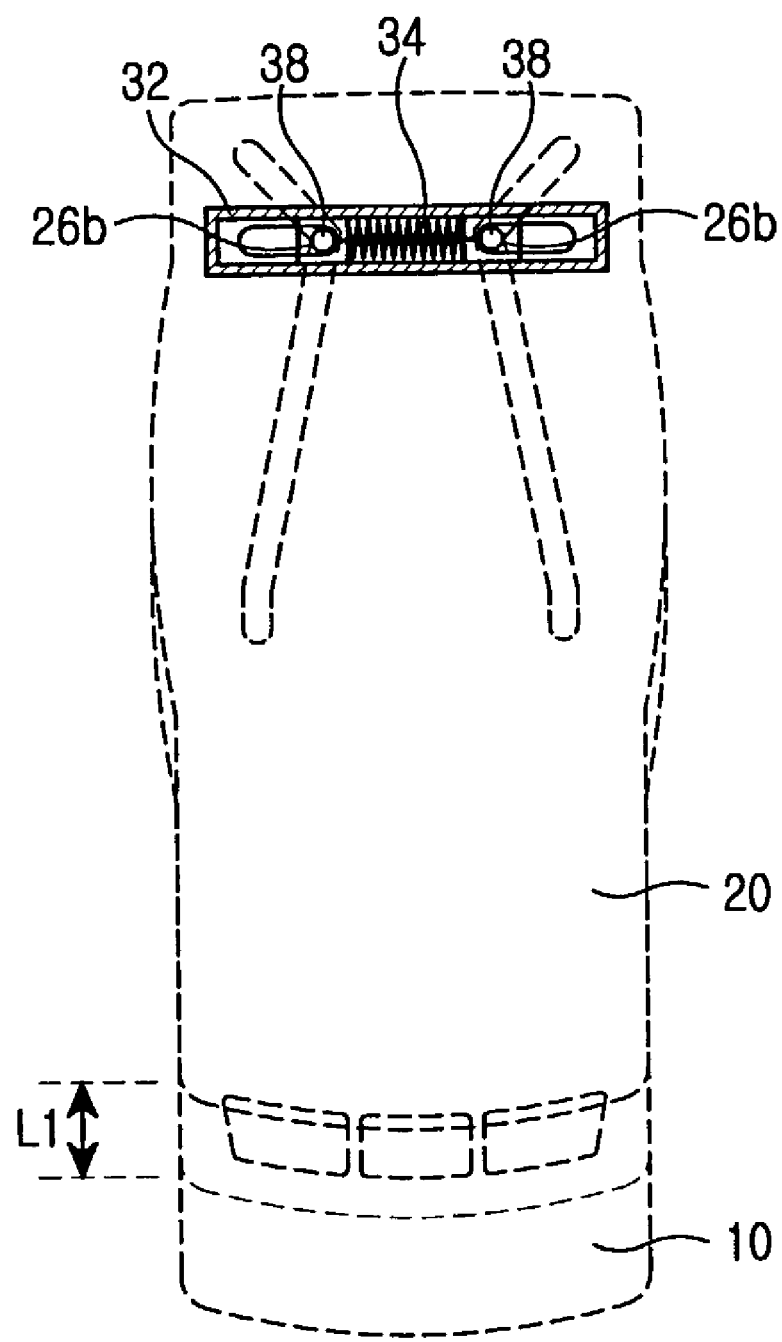
Figure 6C:
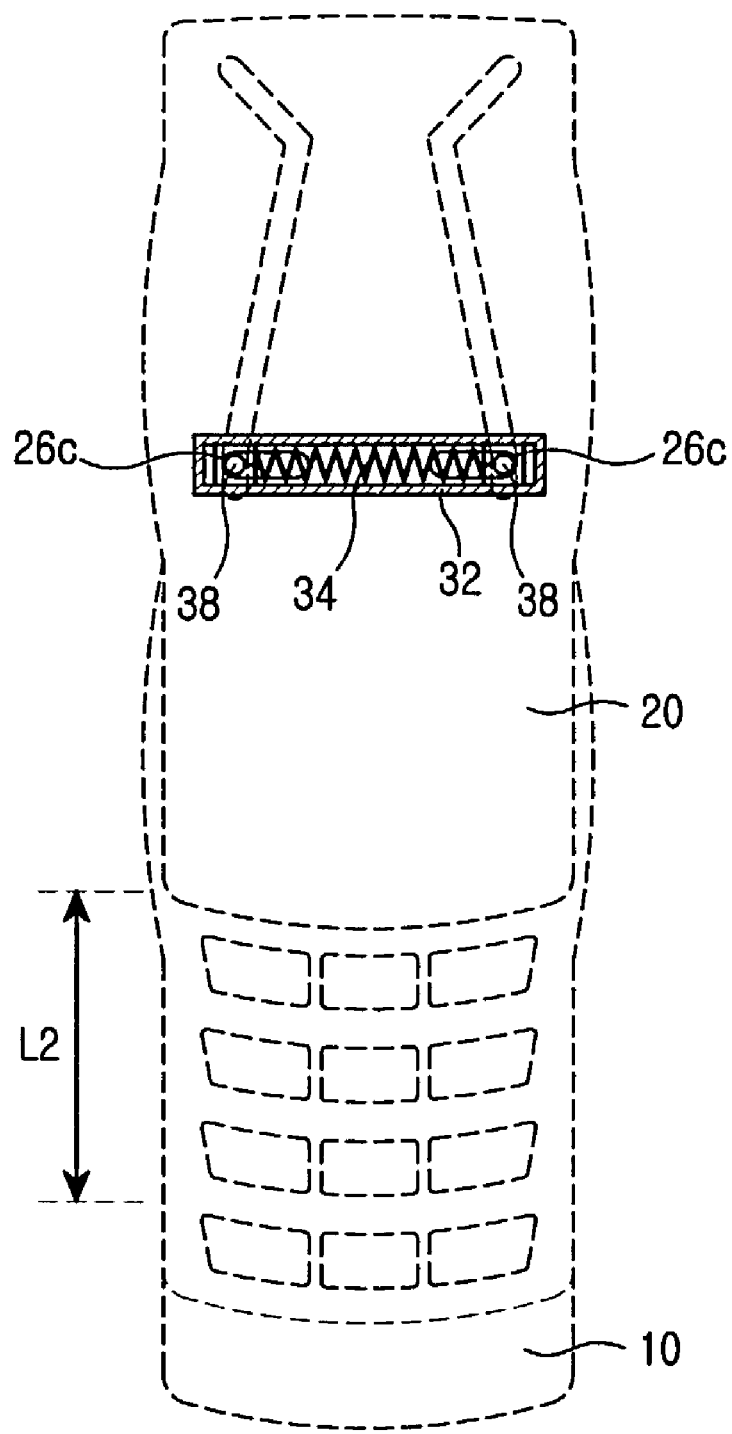

In the sliding type mobile telephone terminal of the present invention, a closing force is provided to the sliding housing 20 when the sliding housing 20 is in the range of a first sliding length L1 (FIG. 6B), and an opening force is provided to the sliding housing 20 when the sliding housing 20 is in the range of a second sliding length L2 (FIG. 6C). That is, the sliding housing 20 of the sliding type mobile telephone terminal of the present invention has to be manually and forcibly opened from the main housing 10 when the sliding housing 20 is in the range of the first sliding length L1, but then is automatically opened from the main housing 10 by the aforementioned opening force when the sliding housing 20 is in the range of the second sliding length L2.

Figure 3:
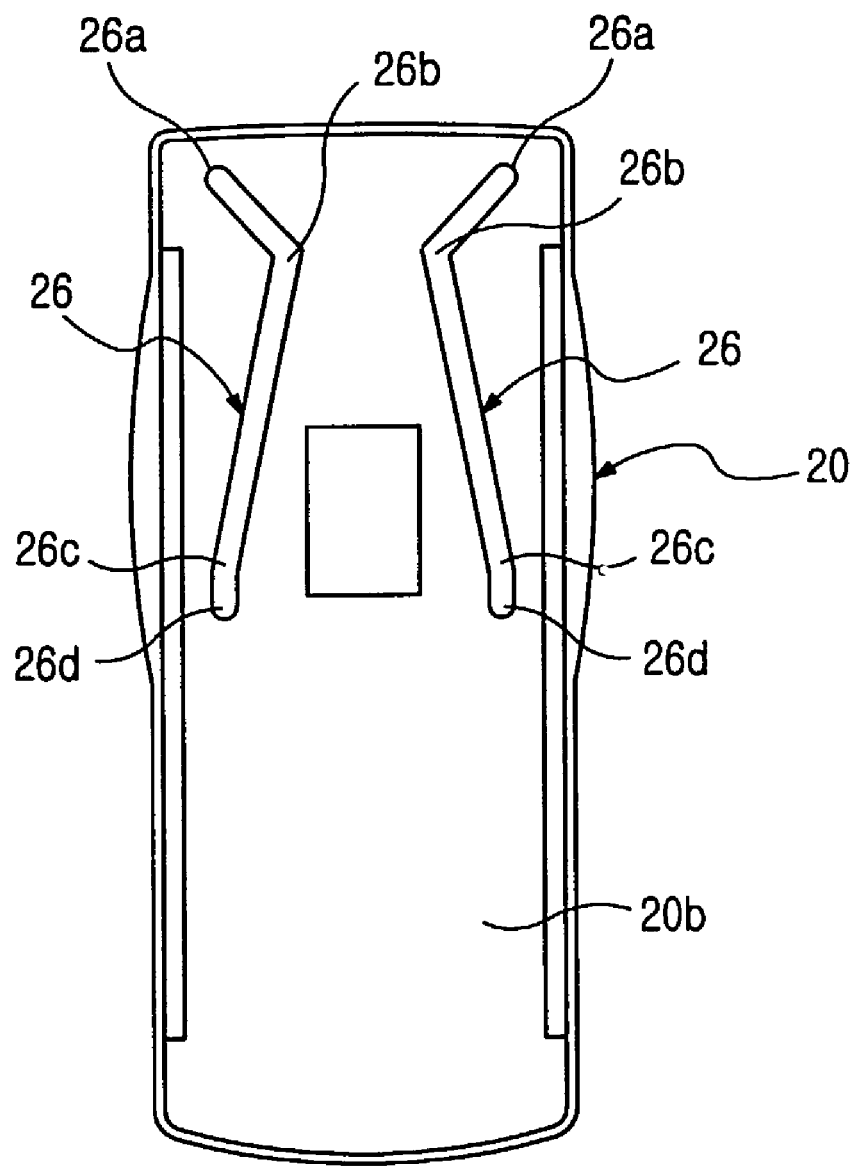
FIG. 3 is a bottom view of the sliding housing in accordance with the preferred embodiment of the present invention.

A protrusion 16 is formed on a front end of the main housing 10. In case the sliding housing 20 is closed into the main housing 10, a front end of the sliding housing 20 abuts the protrusion 16 of the main housing 10. As shown in FIGS. 2 and 3, a lower surface 20b of the sliding housing 20 is opposite to an upper surface 10a of the main housing 10.

A key pad 12 including a plurality of keys is formed on the upper surface 10a of the main housing 10, and a microphone unit 14 is installed on an upper surface 16a of the protrusion 16 of the main housing 10. A speaker unit 22 and a wide LCD (Liquid Crystal Display) 24 is formed on an upper surface 20a of the sliding housing 20.

Figure 4:
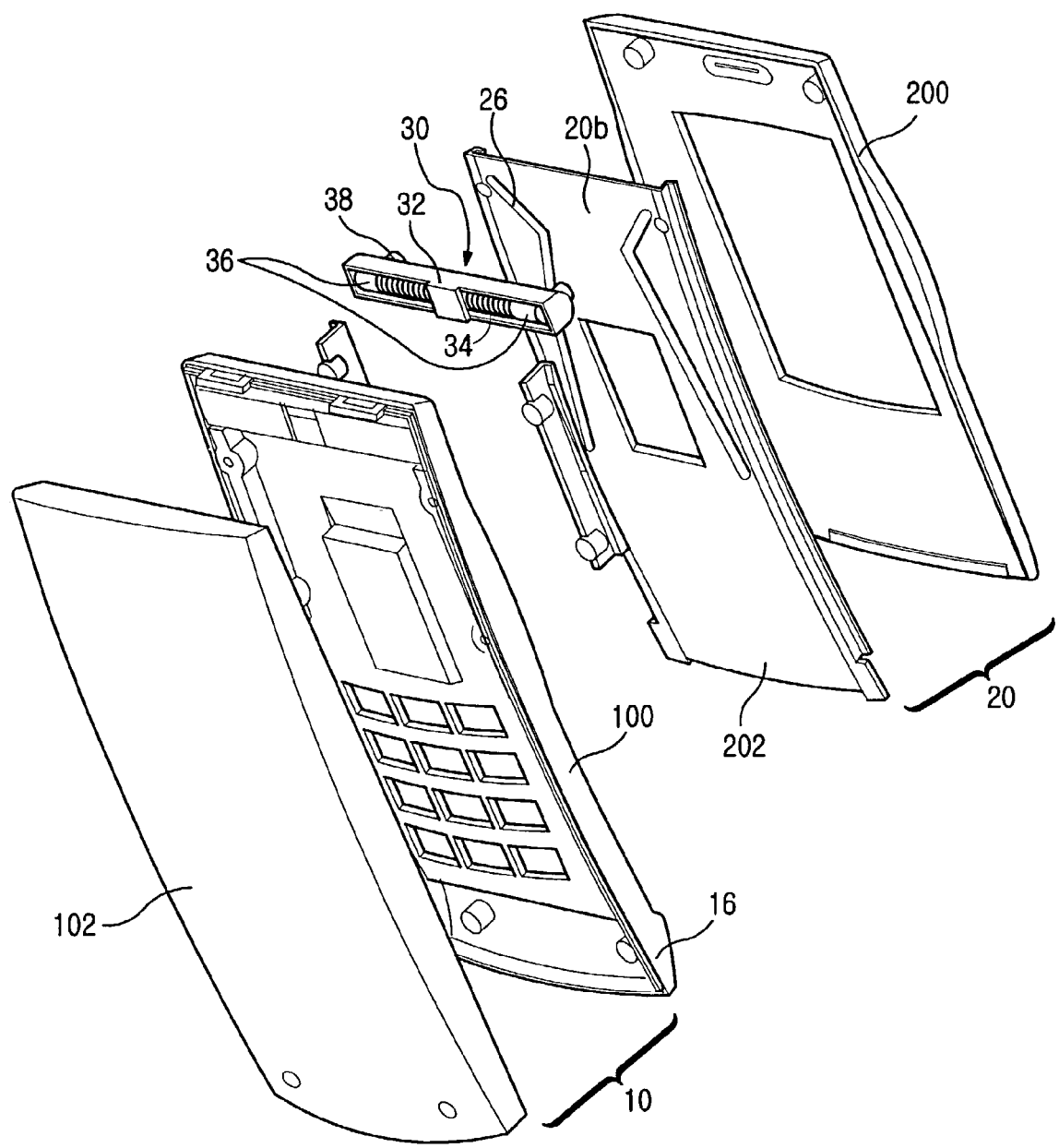
FIG. 4 is an exploded perspective view of the sliding type mobile telephone terminal in accordance with the preferred embodiment of the present invention.

With reference to FIGS. 3 and 4, the sliding type mobile telephone terminal of the present invention is described in detail. As described above, the sliding type mobile telephone terminal of the present invention provides the closing force to the sliding housing 20 when the sliding housing 20 is in the range of the first sliding length L1, and provides the opening force to the sliding housing 20 when the sliding housing 20 is in the range of the second sliding length L2. In order to achieve this function, the sliding type mobile telephone terminal comprises two guide slots 26, i.e., first and second guide slots, and a module 30 associated with the first and second guide slots 26. Herein, the module 30 serves to provide the opening and closing forces to the sliding housing 20.

Hereinafter, with reference to FIG. 3, the first and second guide slots 26 formed on the lower surface 20b of the sliding housing 20 are described in detail. The first and second guide slots 26 are symmetrically formed on the lower surface 20b of the sliding housing 20. The first and second guide slots 26 slantingly extend from respective first ends 26a so as to gradually converge. Next, the first and second guide slots 26 then slantingly extend from closest positions so as to gradually diverge. That is, the closet positions of the first and second guide slots 26 are referred to as bending points 26b.

Stopping holes 26d extending in a designated direction are respectively formed on second ends 26c of the first and second guide slots 26.

As shown in FIG. 4, the sliding housing 20 comprises an upper casing frame 200 and a lower casing frame 202 coupled with the upper casing frame 200. As described above, the LCD is disposed on the upper surface 20a of the upper casing frame 200, and the first and second guide slots 26 are symmetrically formed on the lower surface 20b of the lower casing frame 202.

The first and second guide slots 26 are associated with the module 30, thereby providing the closing force to the sliding housing 20 in the range of the first sliding length L1 and the opening force to the sliding housing 20 in the range of the second sliding length L2.

Figure 5:
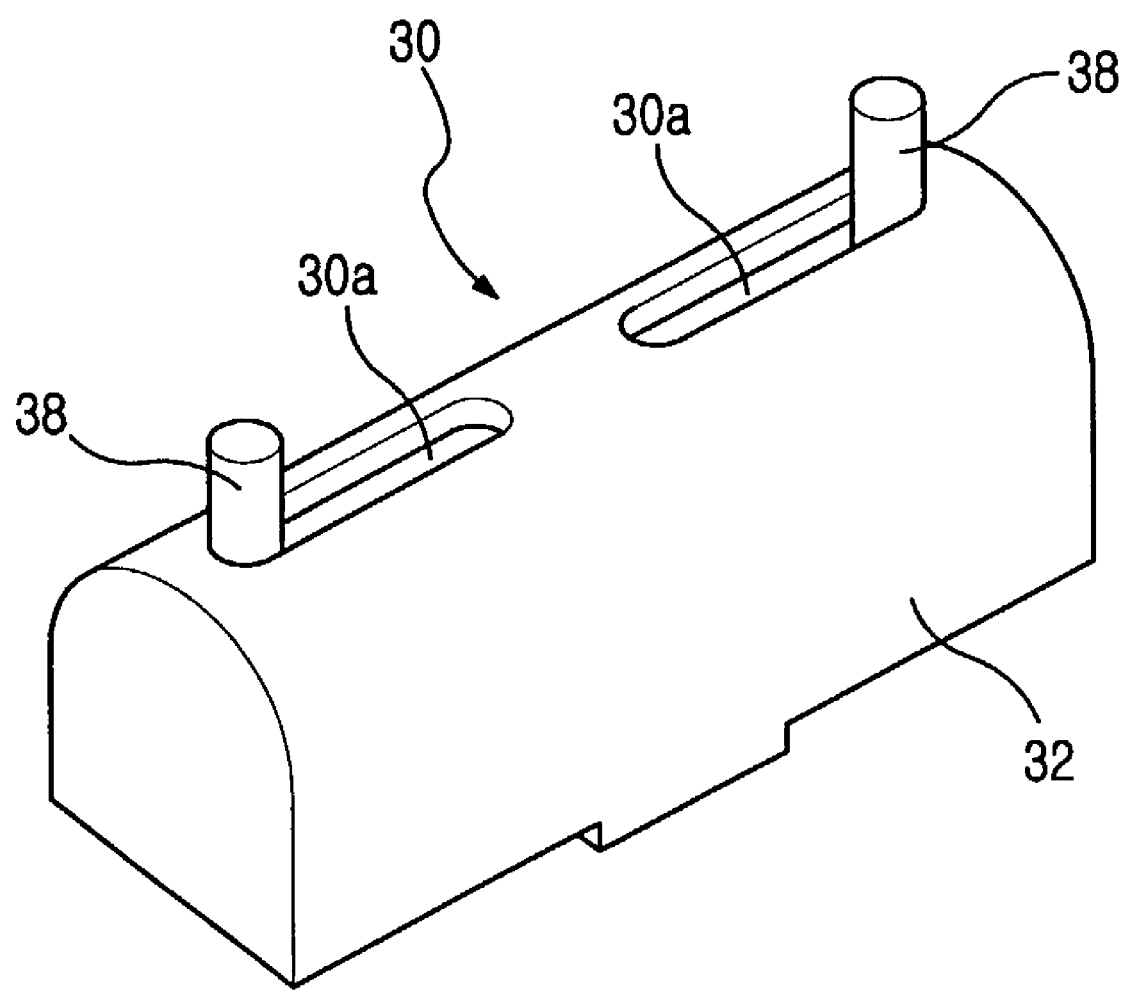
FIG. 5 is a perspective view of a module of the sliding type mobile telephone terminal in accordance with the preferred embodiment of the present invention.

As shown in FIGS. 4 and 5, the module 30 for providing the opening and closing forces to the sliding housing 20 comprises a housing 32, an elastomer 34, a pair of guide bodies 36, and a pair of guide protrusions 38. Herein, the elastomer 34 is accommodated in the housing 32, and the guide bodies 36 are associated with the elastomer 34 and accommodated in the housing 32. The housing 32 is installed in a designated position of the main housing 10. Preferably, the housing 32 is installed on an end of the main housing opposite to the protrusion 16 formed on the front end of the main housing 10. Further, the housing 32 is installed on the main housing 20 in a perpendicular direction to the longitudinal sliding direction of the sliding housing 20. Therefore, the elastomer 34 is also disposed perpendicular to the longitudinal sliding direction of the sliding housing 20. Herein, the elastomer 34 is a compressed coil spring.

The guide bodies 36 are respectively associated with both ends of the compressed coil spring 34. The guide protrusions 38 extend from the guide bodies 36 in a designated direction, thereby protruding to the outside of the housing 32. Therefore, the housing 32 of the module 30 further comprises a pair of third guide slots 30a. Each guide protrusion 38 is inserted into the corresponding third guide slot 30a so as to move along the third guide slot 30a.

The compressed coil spring 34 accommodated in the housing 32 is constricted and stretched according to the opening and closing operations of the sliding housing 20. The two guide protrusions 38 are associated with the both ends of the compressed coil spring 34 and with the first and second guide slots 26, thereby converging or diverging according the opening and closing operations of the sliding housing 20.

Hereinafter, with reference to FIGS. 6A to 6C, the opening and closing operations of the sliding type mobile telephone terminal of the present invention is described in detail. FIG. 6A shows the sliding type mobile telephone terminal of the present invention in the closed condition of the sliding housing 20 into the main housing 10. FIG. 6B shows the sliding type mobile telephone terminal of the present invention in a partially opened condition of the sliding housing 20 from the main housing 10, as much as the first sliding length L1.

At this time, in order to open the sliding housing 20 from the main housing 10 as much as the first sliding length L1, an external force is applied to the sliding housing 20. While the sliding housing 20 is slid on the main housing 10 from the closed condition of FIG. 6A to the partially opened condition of FIG. 6B, that is, while the guide protrusions 38 travel to the bending points 26b of the first and second guide slots 26 from the respective first ends 26a, the closing force is provided to the sliding housing 20. On the other hand, while the sliding housing 20 is slid on the main housing 10 from the partially opened condition of FIG. 6B to the fully opened condition of FIG. 6C, that is, while the guide protrusions 38 travel to the second ends 26c from the respective bending points 26b of the first and second guide slots 26, the opening force is provided to the sliding housing 20. That is, a user provides the external force to the sliding housing 20 only while the sliding housing 20 is slid on the main housing 10 from the closed condition of FIG. 6A to the partially opened condition of FIG. 6B. Thereafter, the sliding housing 20 is automatically and conveniently slid on the main housing 10 from the partially opened condition of FIG. 6B to the fully opened condition of FIG. 6C.

In the partially opened condition of FIG. 6B, the guide protrusions 38 are the closest to each other and the compressed coil spring 34 is most constricted. Consequently, if the user provides the external force to the sliding housing 20 in the opening direction only enough to slide the sliding housing 20 on the main housing 10 just past the first sliding length L1, the sliding housing 20 is then automatically slid on the main housing 10 by the opening force of the module 30, thereby conveniently and fully opening the sliding housing 20 from the main housing 10. On the other hand, in order to close the sliding housing 20 into the main housing 10, if the user provides the external force to the sliding housing 20 in the closing direction only enough to slide the sliding housing 20 on the main housing 10 just past the second sliding length L2, the sliding housing 20 is then automatically slid on the main housing 10 by the closing force of the module 30, thereby conveniently and fully closing the sliding housing 20 to the main housing 10.

As apparent from the above description, the sliding type mobile telephone terminal of the present invention is easy to open and close, thereby being conveniently used by users.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A sliding type mobile telephone terminal comprising:
    a main housing with upper and lower surfaces;
    a sliding housing with upper and lower surfaces having first and second guide slots symmetrically formed on the lower surface to have a designated shape having first and second portions, the first portion of the first and second guide slots shaped for accepting in a range of a first sliding length a closing force from the main housing and the second portion of the first and second guide slots shaped for accepting in a range of a second sliding length being disposed above the first sliding length an opening force from the main housing, thereby being fully closed into and fully opened in one motion from the main housing in a longitudinal sliding direction so that the lower surface of the sliding housing is slid on the upper surface of the main housing; and
    a module accommodated in the main housing and associated with the first and second guide slots to provide the opening and closing forces to the sliding housing.

2. The sliding type mobile telephone terminal as set forth in claim 1, wherein the first portion of the first and second guide slots gradually converges in the range of the first sliding length and the second portion of the first and second guide slots gradually diverges in the range of the second sliding length.

3. The sliding type mobile telephone terminal as set forth in claim 1, wherein each of the first and second guide slots comprises a bending point at a closest position of the first and second guide slots.

4. The sliding type mobile telephone terminal as set forth in claim 1, wherein each of the first and second guide slots comprises a stopping hole extending in a designated direction on one end.

5. The sliding type mobile telephone terminal as set forth in claim 1, wherein the module comprises:
    a module housing;
    an elastomer accommodated in the module housing;
    a pair of guide bodies associated the elastomer; and
    first and second guide protrusions formed integrally with the guide bodies, extending from the guide bodies to the outside of the module housing, and respectively associated with the first and second guide slots.

6. The sliding type mobile telephone terminal as set forth in claim 5, wherein the module housing is installed in a direction perpendicular to the longitudinal sliding direction of the sliding housing.

7. The sliding type mobile telephone terminal as set forth in claim 6, wherein the elastomer provides an elastic force in the perpendicular direction.

8. The sliding type mobile telephone terminal as set forth in claim 5, wherein the elastomer is a compressed coil spring.

9. The sliding type mobile telephone terminal as set forth in claim 5, wherein the module housing comprises a pair of third guide slots, and the first and second guide protrusions are inserted into the third guide slots so as to move along the third guide slots.

10. The sliding type mobile telephone terminal as set forth in claim 1, wherein the second sliding length is longer than the first sliding length.

11. The sliding type mobile telephone terminal as set forth in claim 1, wherein a protrusion is formed on a front end of the main housing, and the protrusion comprises a microphone unit.

* * * * *